(12) United States Patent
Lu (10) Patent No.: US 11,089,377 B2
(45) Date of Patent: Aug. 10, 2021

(54) INTERACTION BASED ON LIVE WEBCAST

(71) Applicant: GUANGZHOU HUYA INFORMATION TECHNOLOGY CO., LTD., Guangdong (CN)

(72) Inventor: Junren Lu, Guangdong (CN)

(73) Assignee: GUANGZHOU HUYA INFORMATION TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/957,965

(22) PCT Filed: Jan. 28, 2019

(86) PCT No.: PCT/CN2019/073351
§ 371 (c)(1),
(2) Date: Jun. 25, 2020

(87) PCT Pub. No.: WO2019/144949
PCT Pub. Date: Aug. 1, 2019

(65) Prior Publication Data
US 2020/0374590 A1    Nov. 26, 2020

(30) Foreign Application Priority Data

Jan. 29, 2018 (CN) .......................... 201810084489.3
Jan. 29, 2018 (CN) .......................... 201810084491.0

(51) Int. Cl.
*H04N 7/173*    (2011.01)
*H04N 21/475*   (2011.01)
(Continued)

(52) U.S. Cl.
CPC ... *H04N 21/4758* (2013.01); *G06F 16/90344* (2019.01); *G06F 16/9554* (2019.01);
(Continued)

(58) Field of Classification Search
CPC .......... H04N 21/4758; H04N 21/2187; H04N 21/235; H04N 21/4334; H04N 21/8545;
(Continued)

(56) References Cited

U.S. PATENT DOCUMENTS 8,316,032 B1* 11/2012 Baluja ................ G06K 9/00469
    707/749
8,806,338 B2*  8/2014 Coldwell ........... H04N 5/44513
    715/710
(Continued)

FOREIGN PATENT DOCUMENTS

CN      104363471       2/2015
CN      105245934       1/2016
(Continued)

OTHER PUBLICATIONS

Office Action issued in China Counterpart Patent Appl. No. 201810084489.3, dated Aug. 20, 2019, along with an English translation thereof.
(Continued)

*Primary Examiner* — Jefferey F Harold
*Assistant Examiner* — Sahar Aqil Riaz
(74) *Attorney, Agent, or Firm* — Greenblum & Bernstein, P.L.C.

(57) ABSTRACT

The present disclosure relates to interaction based on live webcast. In an example, an interaction method includes: receiving a bullet-screen comment message transmitted by a live broadcast client; in response to identifying a reference word string from the bullet-screen comment message, comparing the bullet-screen comment message with answer data corresponding to an interaction task to obtain a matching result; and outputting the matching result.

18 Claims, 6 Drawing Sheets

(51) Int. Cl.
| | |
|---|---|
| *G06F 16/903* | (2019.01) |
| *G06F 16/955* | (2019.01) |
| *G06F 40/237* | (2020.01) |
| *G06K 7/14* | (2006.01) |
| *H04N 21/2187* | (2011.01) |
| *H04N 21/235* | (2011.01) |
| *H04N 21/433* | (2011.01) |
| *H04N 21/8545* | (2011.01) |
| *H04N 21/858* | (2011.01) |

(52) U.S. Cl.
CPC ......... *G06F 40/237* (2020.01); *G06K 7/1413* (2013.01); *G06K 7/1417* (2013.01); *H04N 21/2187* (2013.01); *H04N 21/235* (2013.01); *H04N 21/4334* (2013.01); *H04N 21/858* (2013.01); *H04N 21/8545* (2013.01)

(58) Field of Classification Search
CPC ............ H04N 21/858; H04N 21/4753; H04N 21/8173; H04N 21/4886; H04N 21/4788; H04N 21/4882; G06F 16/90344; G06F 16/9554; G06F 40/237; G06F 40/284; G06K 7/1413; G06K 7/1417
USPC .......................................................... 725/24
See application file for complete search history.

(56) References Cited

U.S. PATENT DOCUMENTS

| | | | | |
|---|---|---|---|---|
| 2004/0018479 | A1* | 1/2004 | Pritchard | G09B 7/02 434/350 |
| 2006/0253330 | A1* | 11/2006 | Maggio | G06Q 30/0257 705/14.2 |
| 2009/0037252 | A1* | 2/2009 | Joyce | G06Q 30/0203 705/7.32 |
| 2011/0281653 | A1* | 11/2011 | Bernard | G07F 17/3272 463/40 |
| 2016/0044226 | A1* | 2/2016 | Williams | H04N 5/23293 348/211.3 |
| 2016/0337717 | A1* | 11/2016 | Ye | H04N 21/23418 |
| 2017/0069043 | A1* | 3/2017 | Doyle | G06F 16/24575 |
| 2017/0092145 | A1* | 3/2017 | Lin | G09B 7/02 |
| 2018/0070143 | A1* | 3/2018 | Joffe | G06F 16/738 |
| 2018/0144051 | A1* | 5/2018 | Stoyanov | H04L 67/306 |

FOREIGN PATENT DOCUMENTS

| | | |
|---|---|---|
| CN | 105435453 | 3/2016 |
| CN | 106101848 | 11/2016 |
| CN | 106790442 | 5/2017 |
| CN | 107371054 | 11/2017 |
| CN | 108347650 | 7/2018 |
| CN | 108347653 | 7/2018 |
| TW | 201026059 | 7/2010 |

OTHER PUBLICATIONS

Official Communication issued in International Bureau of WIPO Patent Application No. PCT/CN2019/073351, dated Apr. 15, 2019.
Office Action issued in China Counterpart Patent Appl. No. 201810084491.0, dated Aug. 21, 2019, along with an English translation thereof.
Office Action issued in China Counterpart Patent Appl. No. 201810084489.3, dated Apr. 1, 2019, along with an English translation thereof.
Office Action issued in China Counterpart Patent Appl. No. 201810084491.0, dated Apr. 1, 2019, along with an English translation thereof.
Office Action issued in China Counterpart Patent Appl. No. 201810084489.3, dated Jun. 3, 2019, along with an English translation thereof.

* cited by examiner

INTERACTION BASED ON LIVE WEBCAST

CROSS-REFERENCE OF RELATED APPLICATIONS

This patent application claims priority to Chinese patent applications Nos. 201810084491.0 and 201810084489.3 filed on Jan. 29, 2018, the entire contents of which are incorporated herein by reference.

TECHNICAL FIELD

The present disclosure relates to interaction based on live webcast.

BACKGROUND

With popularization of information technology, increasingly more people began to get information, learn about news or spend their leisure hours through videos, and people are getting increasingly more relied on videos. In order to improve interactivity, interaction tasks and interaction option controls associated with a sport event can be displayed while a user is watching a live broadcast of the sport event, such that the user can participate in the interaction by triggering the interaction option controls on the client.

SUMMARY

In view of above, the present disclosure provides an interaction method, an interaction apparatus, an electronic device, and a non-volatile machine-readable storage medium.

In a first aspect, the present disclosure provides an interaction method, including: receiving a bullet-screen comment message transmitted by a live broadcast client; in response to identifying a reference word string from the bullet-screen comment message, comparing the bullet-screen comment message with answer data corresponding to an interaction task to obtain a matching result, wherein the reference word string includes at least a part of one or more reference words; and outputting the matching result.

In a second aspect, the present disclosure provides an interaction apparatus, including: a receiving module configured to receive a bullet-screen comment message transmitted by a live broadcast client; and a processing module configured to, when a reference word string is identified from the bullet-screen comment message, compare the bullet-screen comment message with answer data corresponding to an interaction task to obtain a matching result; and output the matching result, wherein the reference word string includes at least a part of one or more reference words.

In a third aspect, the present disclosure provides an electronic device, including: a processor; a memory for storing processor-executable instructions; wherein when reading the processor-executable instructions, the processor is configured to perform the interaction method described in the first aspect.

In a fourth aspect, the present disclosure provides a non-volatile machine-readable storage medium in which a computer program is stored, and when reading the computer program, the processor is caused to perform the interaction method described in the first aspect.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION OF THE EMBODIMENTS

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like can be used in the present disclosure to describe various information, such information should not be limited to these terms. These terms are only used to distinguish one category of information from another. For example, without departing from the scope of the present disclosure, first information can be referred as second information; and similarly, second information can also be referred as first information. Depending on the context, the word as used herein can be interpreted as "when" or "upon" or "in response to determining".

Figure 1:
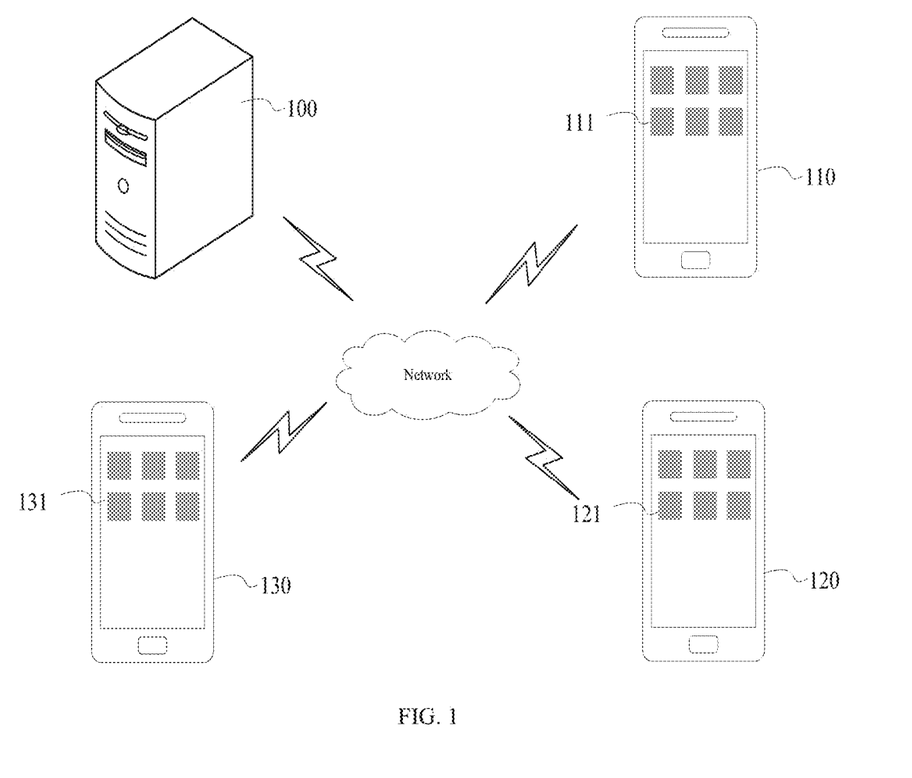
FIG. 1 is a schematic diagram illustrating a live webcast scenario according to an example of the present disclosure.

FIG. 1 is a schematic diagram illustrating a live webcast according to an example of the present disclosure. Referring to FIG. 1, a first audience client 111, a second audience client 121, and an anchor client 131 are installed on the electronic devices 110, 120, and 130, respectively. The anchor client 131 can produce live broadcast data by calling a camera to record a video or take a photo, or by capturing a screen or the like. The live broadcast data can include a live broadcast video stream, and then the live broadcast data is transmitted to a live broadcast server 100 over the network. The audience clients and the anchor client can all transmit an input bullet-screen comment message to the live broadcast server 100. The live broadcast server 100 is configured to provide background services for the live webcast, such as storing a correspondence relationship between anchor client and audience client, and processing and distributing live broadcast data and bullet-screen comment messages. When the first audience client 111, the second audience client 121 and the anchor client 131 are in the same channel, the anchor client 131 can share the live broadcast data to the first audience client 111 and the second audience client 121 in the same channel, such that the interface of each client in the channel plays the live broadcast video stream. After the user of the client in the above channel enters and transmits a bullet-screen comment message in a bullet-screen comment input box, the bullet-screen comment message can be uploaded to the live broadcast server, and the live broadcast server can process the bullet-screen comment message. The live broadcast server can also distribute the bullet-screen comment message to each client in the channel, such that the bullet-screen comment message can be obtained and/or displayed on the interface of each client in the channel.

Figure 2:
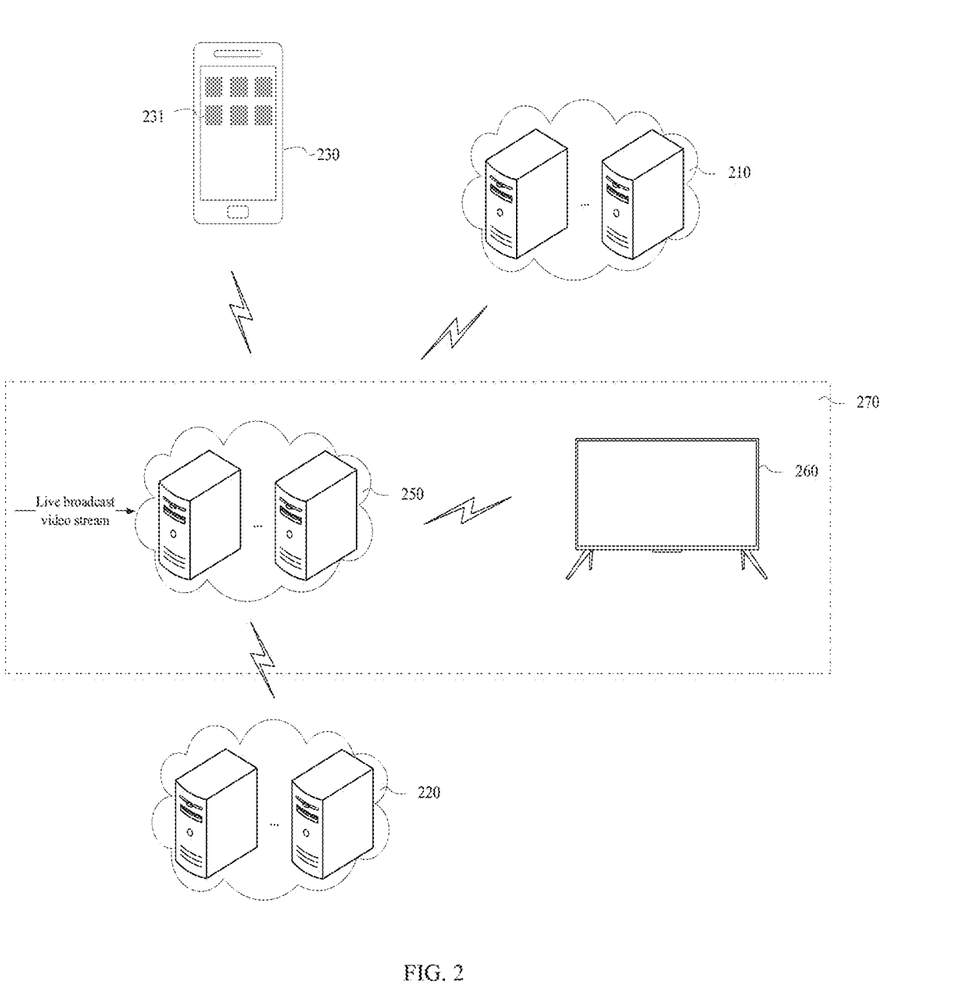
FIG. 2 is a schematic diagram illustrating a scenario in which TV rebroadcasts a live broadcast video stream according to an example of the present disclosure.

FIG. 2 is a schematic diagram illustrating a scenario in which TV (television) rebroadcasts a live broadcast video stream according to an example of the present disclosure. Referring to FIG. 2, a rebroadcast server 250 and a TV 260 belong to a TV live broadcast system 270. The rebroadcast server 250 can be configured to process a live broadcast video stream and other data obtained. The other data can be obtained from a live broadcast server 220, other playback terminals 231 installed on an electronic device 230 and a server 210 corresponding to the other playback terminals. In addition, the rebroadcast server 250 is also configured to transmit the processed live broadcast video stream and other data to the live broadcast server 220, the TV 260, other playback terminals 231 and the server 210 corresponding to the other playback terminals, such that frames corresponding to the processed live broadcast video stream and/or other data are displayed in a designated channel of the TV or a live broadcast client or other playback terminals.

The electronic device 230 includes a device with a wireless signal receiver or a device with receiving and transmitting hardware. The device with a wireless signal receiver is not capable of transmitting. The device with receiving and transmitting hardware can perform two-way communication on a two-way communication link. The electronic device 230 can include: a cellular or other communication device with a single-line display or a multi-line display; PCS (Personal Communications Service), which can combine voice, data processing, fax, and/or data communication capabilities; PDA (Personal Digital Assistant), which can include a radio frequency receiver, a pager, internet/intranet access, a web browser, a notepad, a calendar and/or a GPS (Global Positioning System) receiver; a conventional laptop and/or a palmtop computer or other device, which can have a radio frequency receiver. The electronic device 230 can also include a communication terminal, an Internet terminal, a music/video playback terminal, such as a PDA, a MID (Mobile Internet Device), a mobile phone with a music/video playback function, a smart TV (television) or the like.

A channel refers to a social networking platform, an instant messaging platform, etc., where multiple users get together. Clients in the same channel have the same label.

After logging in to a client, a user can enter a channel based on label information of the channel. The user exists as a member in the channel, and members with respective identities, such as audiences and anchors, exist in the channel. Users can join or leave the channel as desired. For a user with a certain permission (such as an anchor), such user can add or delete members in the channel, and can also create or dismiss the channel. Within a channel, any number of members can interact with one another through chats (for example, chats with bullet-screen comment messages), calls, videos, or by sending electronic gifts, and so on.

The "client", "live broadcast client", "anchor client", and "audience client" can refer to a software installed on the electronic device. In some cases, the anchor client and the audience client are integrated on the same software. When the identity of the user is an anchor, the client of the user can be referred to as an anchor client. When the identity of the user is an audience, the client of the user can be referred to as an audience client.

The live broadcast server and the rebroadcast server provided in the examples of the present disclosure can include a server device, or a collective term of server systems, or can include at least one software installed on the server device.

Users can get information, learn about news or spend their leisure hours through videos. In order to improve interactivity, the interaction tasks and interaction option controls associated with the event can be displayed while the user is watching the live broadcast of the sports event, such that the user can participate in the interaction by triggering the interaction option controls on the client. However, the interaction method by triggering the interaction option controls on the client requires changing the architecture (configuration) of the live broadcast client of video, which increases an upgrading and updating frequency and cost of the live broadcast software of video.

In view of the above, the present disclosure provides an interaction method, which can be applied in the live webcast scenario or the integrated scenario with a live webcast scenario and a scenario in which TV rebroadcasts a live broadcast video stream. Of course, it can be understood that the interaction method provided in the present disclosure can be also applied in other scenarios, which will not be elaborated herein.

Figure 3:
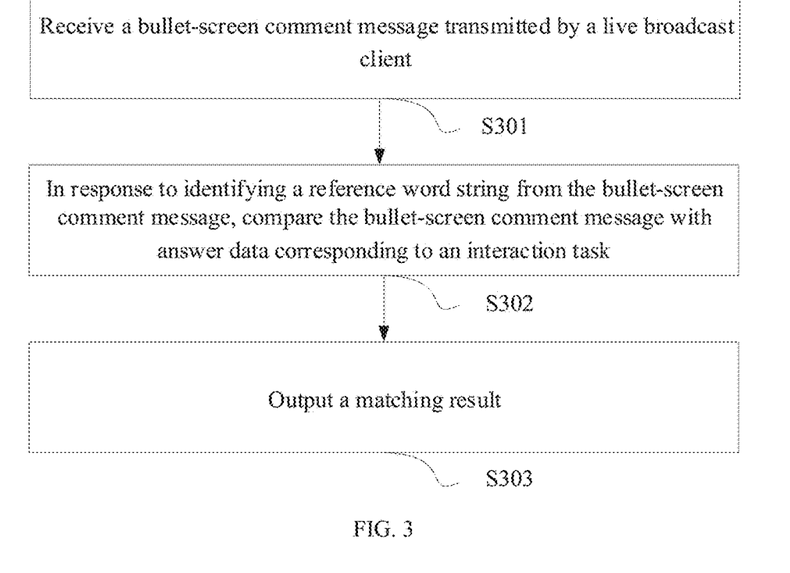
FIG. 3 is a flowchart illustrating an interaction method according to an example of the present disclosure.

A user may see an interaction task on an interface of a live broadcast client or other interface, for example: when watching a World Cup football game, the user sees an interaction task "Which of the following teams will win the game? A China, B Brazil, C draw", to participate in the interaction task, the user can log in to the live broadcast client to participate in the interaction task by transmitting a bullet-screen comment message, such as transmitting a bullet-screen comment message "I think the answer is A". FIG. 3 is a flowchart of an interaction method provided by an example of the present disclosure. This method can be executed by the live broadcast server or the anchor client. The method includes the following steps.

S301, a bullet-screen comment message transmitted by a live broadcast client is received.

S302, if a reference word string is identified from the bullet-screen comment message, the bullet-screen comment message is compared with answer data corresponding to an interaction task to obtain a matching result, where the reference word string includes at least a part of one or more reference words.

S303, the matching result is output.

In some examples, step S303 can include: outputting the matching result, and recording the live broadcast client transmitted the bullet-screen comment message.

In an example, the bullet-screen comment message includes words, symbols, and emoji entered by the user in an interaction message bar on the live broadcast client.

In the interaction method provided in the present disclosure, the bullet-screen comment message function of the live broadcast client is utilized. A bullet-screen comment message transmitted by a user is classified into a bullet-screen comment message for an interaction task (referred to as an interactive bullet-screen comment message), or a bullet-screen comment message for the live broadcast video stream or the chat between audience and anchor (referred to as a non-interactive bullet-screen comment message). By determining whether the bullet-screen comment message includes a reference word string, it is determined whether the bullet-screen comment message belongs to the interactive bullet-screen comment message, and the interactive bullet-screen comment message is compared with the answer data corresponding to the interaction task to output the interaction result. Without upgrading and updating the original live broadcast client, the user can participate in the interaction task, thereby reducing the upgrading and updating frequency of the live broadcast client and the cost of manually writing code. Moreover, the interactive bullet-screen comment message entered by the user do not need to adopt a fixed format, as long as the interactive bullet-screen comment message includes a reference word string, for example, at least part of one or more reference words. Thus, the user can have more freedom, for example, the user can add comment content into an interactive bullet-screen comment message, which can further improve the user experience.

The one or more reference words can include a designated word, which can be configured based on the content of the interaction task, such as a specific letter or the word "interaction"; or any word input by an official staff. The one or more reference words can also include interaction option information in the interaction task. For example, the interaction task is "The result of the football game will be? A China, B Brazil, C draw", and the interaction option is "A China, B Brazil, C draw", then the one or more reference words can include a/b/c/A/B/C/China/Brazil/Draw. The one or more reference words is used to distinguish interactive bullet-screen comment messages from non-interactive bullet-screen comment messages, and can effectively reduce the amount of calculation.

In an example, comparing the bullet-screen comment message with the answer data corresponding to the interaction task includes: determining whether the bullet-screen comment message includes the answer corresponding to the interaction task, and if the bullet-screen comment message includes the answer, the matching result indicates that the matching is successful, otherwise, the matching result indicates that the matching fails.

In practical applications, the following situation may occur. For example, the interaction task is "Which of the following teams will win the game? A China, B Brazil, C draw", and the corresponding answer is B. When the bullet-screen comment message transmitted by the user includes "ABC", and in this case, the reference word string in the bullet-screen comment message is "ABC", it is possible to mistakenly consider that the client that transmitted the bullet-screen comment message "ABC" is matched successfully, thereby causing an inaccurate matching result. To solve the above problem, in some examples, it can be first determined whether the interactive bullet-screen comment message includes wrong answer data. For example, the wrong answer data is "B Brazil, C draw". If the interactive bullet-screen comment message includes wrong answer data, the matching result indicates that the matching fails; if the interactive bullet-screen comment message does not include wrong answer data, then it is further determined whether the interactive bullet-screen comment message includes correct answer data corresponding to the interaction task. If the interactive bullet-screen comment message does not include correct answer data, the matching result indicates that the matching fails; and if the interactive bullet-screen comment message includes correct answer data, the matching result indicates that the matching is successful. In this way, the accuracy of matching can be improved. The wrong answer data can be input by official staff or users, or can be obtained based on option information and answer data.

In some examples, upon receiving the bullet-screen comment message, the bullet-screen comment message can be segmented to obtain the processed bullet-screen comment message; and then the reference word string can be identified from the processed bullet-screen comment message.

In practical applications, since there is no limit to the number of bullet-screen comment messages transmitted by each live broadcast client, the following problem may occur. For example, the interaction task is "Which team will win the game? A China B Brazil, C draw", and the corresponding answer is B. The user of the live broadcast client can transmit three bullet-screen comment messages "A", and "C" to make successful matching, which leads to a low matching accuracy. To solve the above problem, in some examples, if a reference word string is identified from the bullet-screen comment message, the live broadcast client which transmitted the bullet-screen comment message is recorded; upon receiving the bullet-screen comment message from the live broadcast client, if the live broadcast client has been recorded, other interactive bullet-screen comment messages transmitted by the live broadcast client will not be identified. In this way, it can prevent the live broadcast client from transmitting multiple interactive bullet-screen comment messages, thereby improving the accuracy of the matching result.

In some examples, if a reference word string is identified from the bullet-screen comment message, the bullet-screen comment message is an interactive bullet-screen comment message. When the live broadcast client transmits the interactive bullet-screen comment message again, the user can be notified that the interactive bullet-screen comment message has been transmitted.

To further reduce the amount of calculation, in some examples, when the one or more reference words include the interaction option information in the interaction task, upon receiving the bullet-screen comment message, if an option corresponding to the interaction option information is identified from the bullet-screen comment message, the option is extracted, and the option is compared with the answer data corresponding to the interaction task.

In some examples, an interaction task can include multiple interactive questions. In this case, identifying the reference word string from the bullet-screen comment message includes: when the one or more reference words include the interaction option information, determining whether a number of options included in the bullet-screen comment message is the same as a number of the interactive questions. For convenience of description, taking three interactive questions as an example, if the interaction task is "Interactive question 1: A, B, C; interactive question 2: A, B, C; interactive question 3: A, B", for example, a bullet-screen comment message including "AABB" transmitted by the user can be determined as a non-interactive bullet-screen comment message.

The interaction task is generally valid within a short time period. For example, after a live broadcast football game ends, the interaction task is invalid. In some examples, only bullet-screen comment messages received within a preset time period will be processed as at step S302, and bullet-screen comment messages received after the preset time period will not be processed. In this way, interaction can be performed in any live broadcast room on the Internet, or can be ended at any time. The user experience can be improved.

In some examples, the interaction task can be generated by the anchor client or the live broadcast server.

Figure 4:
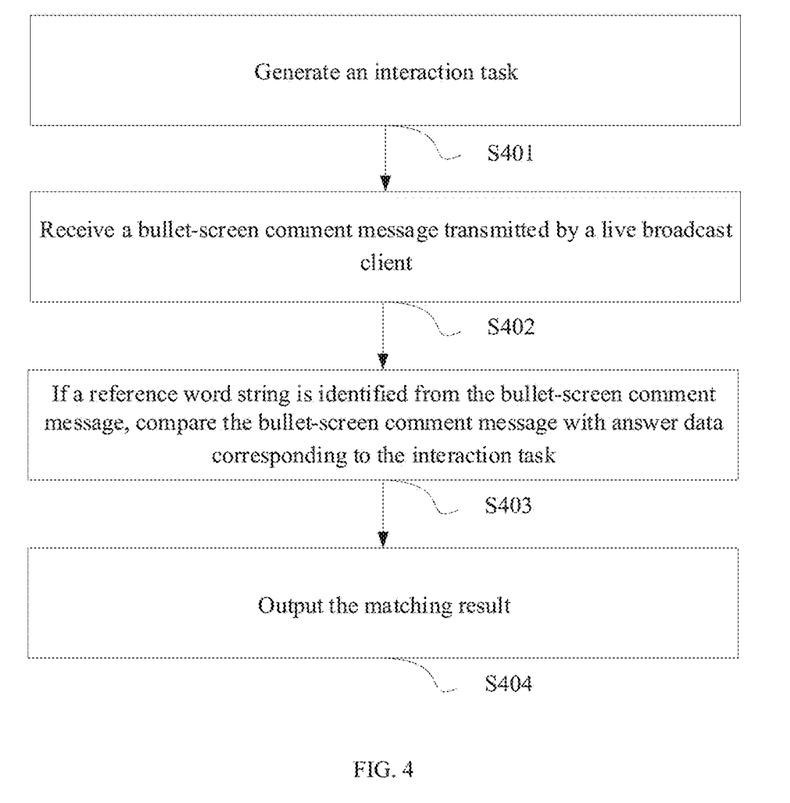
FIG. 4 is a flowchart illustrating an interaction method according to another example of the present disclosure.

FIG. 4 is a schematic flowchart illustrating an interaction method according to another example of the present disclosure. The method can be performed by a live broadcast server or an anchor client, and includes the following steps.

S401, an interaction task is generated.

S402, a bullet-screen comment message transmitted by a live broadcast client is received.

S403, if a reference word string is identified from the bullet-screen comment message, the bullet-screen comment message is compared with answer data corresponding to an interaction task to obtain a matching result, where the reference word string includes at least part of one or more reference words.

S404, the matching result is outputted.

In an example, the interaction task includes at least one interaction question and/or at least one piece of interaction option information. The interaction task can be input by a user or an official staff, or can be automatically generated based on the content of the live broadcast video stream. The interaction task can be displayed in a designated channel on the TV or the live broadcast client in the form of a picture or a picture layer. The designated channel can be a channel dedicated to a certain interaction task, and all live broadcast clients in the designated channel can participate in the interaction by transmitting a bullet-screen comment message.

Figure 5:
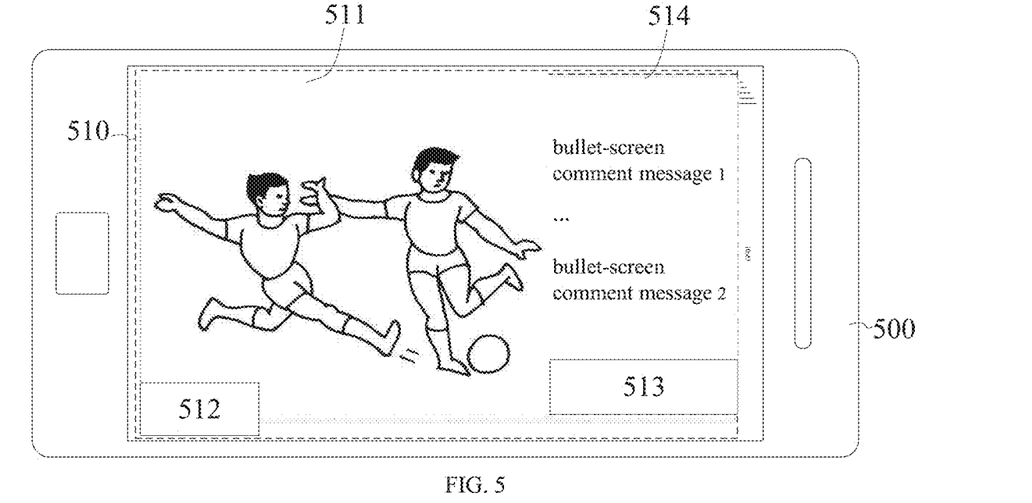
FIG. 5 is a schematic diagram illustrating an interface of an live broadcast client according to an example of the present disclosure.

Taking a live webcast scenario as an example, referring to FIG. 1, the anchor client 131 can produce a live broadcast video stream. For convenience of description, it is assumed that an ID (Identity) of a channel where the anchor client 131 is located is abc, and the live broadcast server 100 generates an interaction task, and transmits the interaction task to the live broadcast clients 111, 121, and 131 in the channel with ID abc. Upon receiving the interaction task, the live broadcast clients 111, 121, and 131 display the interaction task on the interfaces and participate in the interaction by transmitting a bullet-screen comment message. With reference to FIG. 5, FIG. 5 is a schematic diagram of an interface of a live broadcast client provided by an example of the present disclosure. The live broadcast client operates on the electronic device 500, and a current frame 511 and an interaction task 512 corresponding to the live broadcast video stream are displayed on the interface 510 of the live broadcast client. The user can input a bullet-screen comment message in the message input box 513. After the user enters the bullet-screen comment message, the bullet-screen comment message is transmitted to the live broadcast server 100. Upon receiving the bullet-screen comment message, the live broadcast server 100 processes the bullet-screen comment message, and if a reference word string is identified from the bullet-screen comment message, the bullet-screen comment message is compared with the answer data corresponding to the interaction task, to output a matching result.

In an example, the interaction task generated by the live broadcast server 100 can be combined with the live broadcast video stream to generate a target video stream, and displayed on the interface of the live broadcast client in the designated channel. For example, after the live broadcast server 100 generates an interaction task, the interaction task and the live broadcast video stream transmitted by the anchor client can be combined into a target video stream, and then the target video stream can be transmitted to an audience client in a designated channel for display. In other examples, after generating an interaction task on the live broadcast server, the interaction task can be transmitted to the anchor client, and the anchor client can combine the interaction task and the live broadcast video stream to a target video stream and transmit the target video stream to the live broadcast server. The live broadcast server then transmits the target video stream to a live broadcast client in the same channel for display. In some examples, the interaction task can also be superimposed on the live broadcast video stream in the form of a picture or a picture layer and displayed on the interface of the live broadcast client in the same channel. Of course, it can be understood that, in addition to being provided by a live broadcast client, the live broadcast video stream can also be provided by a live broadcast server. The present disclosure does not limit the source of the live broadcast video stream.

Figure 6:
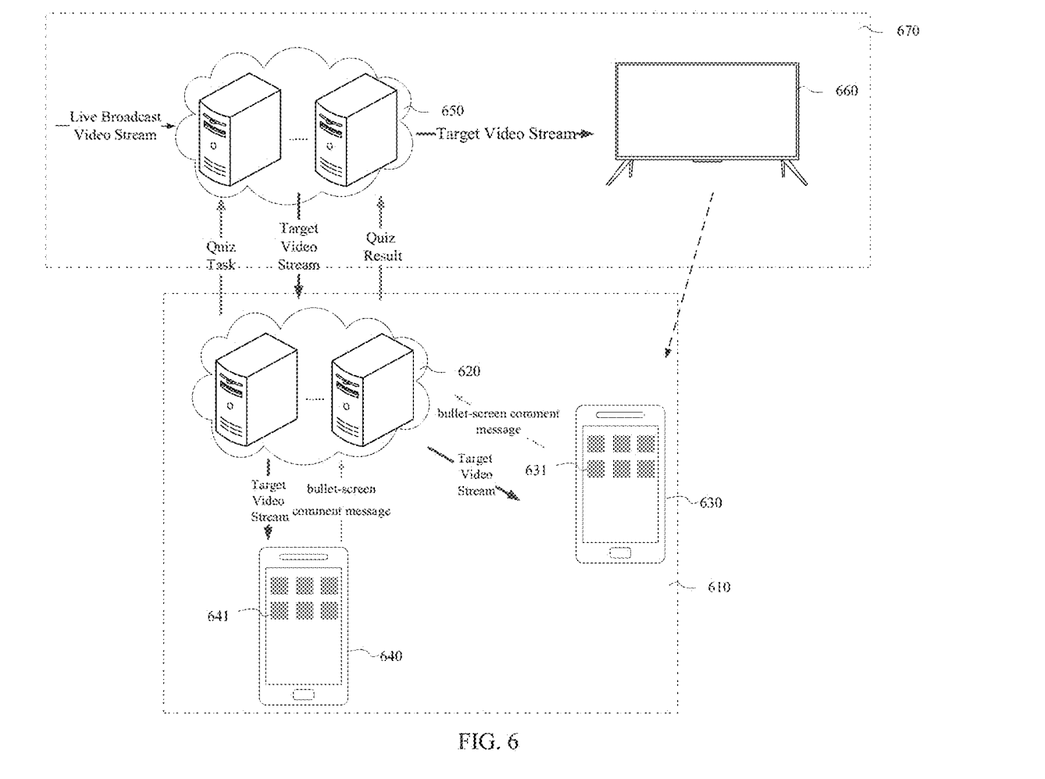
FIG. 6 is a schematic diagram illustrating an integrated scenario with a live webcast scenario and a scenario in which TV rebroadcasts a live broadcast video stream according to an example of the present disclosure.

Take the integrated scenario with a live webcast scenario and a scenario in which TV rebroadcasts a live broadcast video stream as an example. FIG. 6 is a schematic diagram of an integrated scenario with a live webcast scenario and a scenario in which TV rebroadcasts a live broadcast video stream according to an example of the present disclosure. Referring to FIG. 6, a rebroadcast server 650 and a TV 660 belong to a TV rebroadcast system 670 for a live broadcast video stream. A live broadcast server 620, a first live broadcast client 631, and a second live broadcast client 641 belong to a live webcast system 610. The first live broadcast client 631 and the second live broadcast client 641 are installed on the electronic devices 630 and 640, respectively. The live broadcast server 620 generates an interaction task and transmits the interaction task to the rebroadcast server 650. The rebroadcast server 650 receives the live broadcast video stream and the interaction task transmitted by the live broadcast server 620, combines the interaction task and the live broadcast video stream into a target video stream, and transmits the target video stream to the TV 660. After seeing the interaction task displayed on the TV, the user can log in to the live broadcast client 631, enter the live broadcast room of the designated channel, and participate in the interaction by transmitting a bullet-screen comment message. The rebroadcast server 650 can also transmit the target video stream to the live broadcast server 620, and the live broadcast server 620 transmits the target video stream to the live broadcast client 641 at the designated channel. The live broadcast client 641 can participate in the interaction by transmitting a bullet-screen comment message. Upon receiving the bullet-screen comment message, the live broadcast server 620 processes the bullet-screen comment message, and if a reference word string is identified from the bullet-screen comment message, compares the bullet-screen comment message with the answer data corresponding to the interaction task, and Outputs a matching result.

Figure 7:
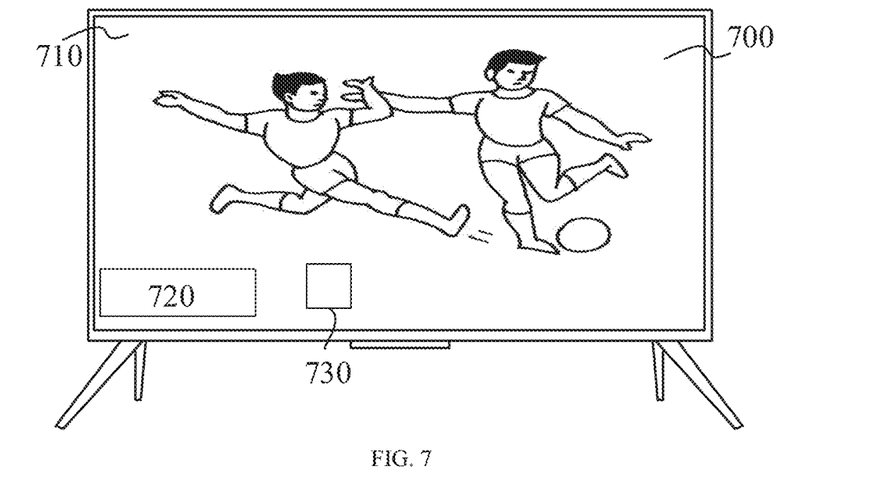
FIG. 7 is a schematic diagram illustrating an interface of TV according to an example of the present disclosure.

To allow users who see the interaction task on the TV to quickly participate in the interaction, in some examples, referring to FIG. 6, the live broadcast server 620 can generate a graphic code based on the identification information of the designated channel to participate in the interaction and address information of a designated live broadcast client resource, and transmit the graphic code to the rebroadcast server 650. The rebroadcast server 650 can combine the graphic code and the live broadcast video stream into a target video stream and transmit the target video stream to the TV 660, such that the TV 660 displays the graphic code, and the graphic code can include a two-dimensional code and a barcode. FIG. 7 is a schematic diagram illustrating a TV interface according to an example of the present disclosure. Referring to FIG. 7, the target video stream 700 can include a frame 710 of the live broadcast video stream, an interaction task 720, and an graphic code 730, and the user can scan the graphic code 730 with an electronic device 630. If the designated live broadcast client, such as, the live broadcast client 631, has been installed in the electronic device 630, the live broadcast client 631 is started, and enter the designated channel based on the identification information of the designated channel to participate in the interaction, such that the user can participate in the interaction; if the electronic device 630 is not installed with the designated live broadcast client, the designated live broadcast client resource can be obtained based on the address information of the designated live broadcast client resource, such that the user can quickly install the designated live broadcast client and participate in the interaction.

In some examples, after the matching result indicates that the matching is successful, the matching result can be transmitted to the TV or the live broadcast client, and the live broadcast client that transmitted the bullet-screen comment message can be rewarded, such as resources. For example, the live broadcast client matched successfully is posted on the interface of the live broadcast client or the TV at the designated channel. Specifically, the live broadcast server can transmit the matching result to the rebroadcast server, and the rebroadcast server combines the matching result and the live broadcast video stream into a target video stream and transmits the target video stream to the TV for display.

In examples of the present disclosure, the original bullet-screen comment message function of the live broadcast client can be utilized, and when the bullet-screen comment message includes a reference word string, the bullet-screen comment message is compared with the answer data corresponding to the interaction task, to allow the user to participate in interaction. In this way, it can not only increase the participation of users in the live webcast and TV live broadcast, but also increase the viscosity of users. More notably, the interaction method provided in the present disclosure does not need to add any new interface, but uses the original bullet-screen comment message function of the live broadcast client. The original bullet-screen comment message function of the live broadcast client is intended to promote the interactive communication between the audience and the anchor, and the interaction method provided in the present disclosure makes the original bullet-screen comment message have the function of participating in the interaction task without updating or upgrading the original live broadcast client, and can reduce the upgrading and updating frequency of live broadcast client.

Corresponding to the above examples of the interaction method, the present disclosure also provides examples of the interaction apparatus.

Figure 8:
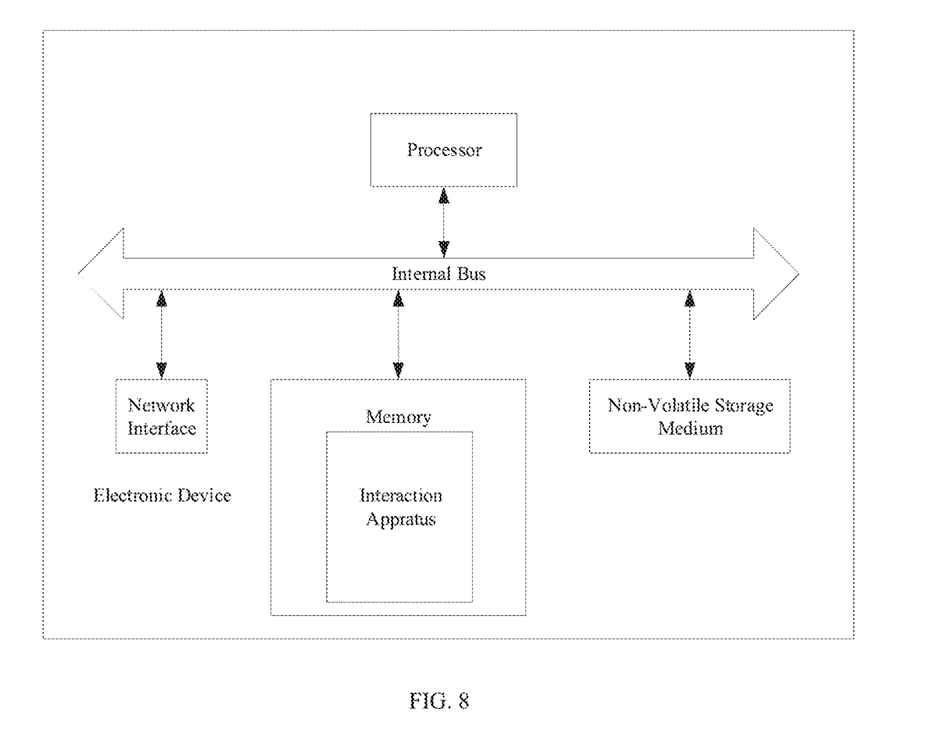
FIG. 8 is a hardware structural diagram illustrating an electronic device according to an example of the present disclosure.

The interaction apparatus provided by examples of the present disclosure can be applied to an electronic device. The apparatus examples can be implemented by software, or by hardware or a combination of hardware and software. Taking software implementation as an example, as a logical apparatus, the apparatus is formed by reading the corresponding computer program instructions in the non-volatile storage medium into the memory through the processor of the electronic device where the apparatus is located. From a hardware perspective, as shown in FIG. 8, FIG. 8 is a hardware structure diagram of the electronic device where the interaction apparatus of the present disclosure is located. In addition to the processor, the memory, the network interface, and the non-volatile storage medium shown in FIG. 8, the electronic device can include other hardware based on the actual function, which will not be elaborated herein. Referring to FIG. 8, the present disclosure discloses an electronic device, including: a storage medium storing processor-executable instructions; wherein the processor is coupled to the storage medium, and the processor is configured to read the processor-executable instructions stored in the storage medium and execute the interaction method described above.

Figure 9:
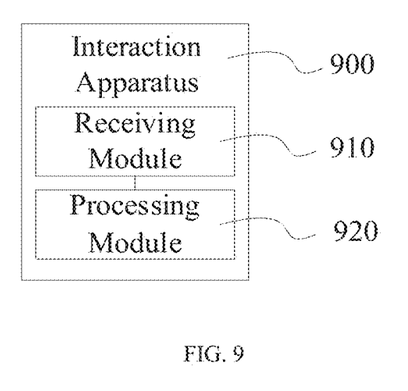
FIG. 9 is a logic block diagram illustrating art interaction apparatus according to an example of the present disclosure.

FIG. 9 is a logic block diagram illustrating an interaction apparatus 900 according to an example of the present disclosure. The interaction apparatus 900 includes:

a receiving module 910 configured to receive a bullet-screen comment message transmitted by a live broadcast client;

a processing module 920 configured to, if a reference word string is identified from the bullet-screen comment message, compare the bullet-screen comment message with answer data corresponding to an interaction task to obtain a matching result; and output the matching result.

In some examples, the reference word string includes at least part of one or more reference words, and the one or more reference words is configured based on the content of the interaction task. The one or more reference words is input by the user. The one or more reference words includes one or more of a designated word; and interaction option information in the interaction task.

In some examples, the processing module 920 is further configured to perform word segmentation processing on the bullet-screen comment message to obtain processed bullet-screen comment message; and identify the reference word string from the processed bullet-screen comment message.

In some examples, the one or more reference words include interaction option information in the interaction task.

The processing module 920 is further configured to, if an option corresponding to the interaction option information in the interaction task is identified from the bullet-screen comment message, extract the option; and compare the option with the answer data corresponding to the interaction task.

In some examples, after identifying the reference word string, the processing module 920 is further configured to record the live broadcast client that transmitted the bullet-screen comment message; and if the bullet-screen comment message transmitted by the live broadcast client has been identified as containing the reference word string, skip identifying other bullet-screen comment messages transmitted by the live broadcast client.

In some examples, the bullet-screen comment message is a bullet-screen comment message received within a preset time period.

In some examples, the device 900 further includes an interaction task generating module. In an example, the interaction task generating module is configured to generate an interaction task; transmit the interaction task to a rebroadcast server, such that the rebroadcast server combines the interaction task with a live broadcast video stream into a target video stream and transmits the target video stream to a TV; generate a graphic code based on the identification information of a designated channel of the live broadcast client and address information of the live broadcast client; and transmit the graphic code to the TV, such that the live broadcast client transmits the bullet-screen comment message by scanning the graphic code displayed on the TV. The processing module 920 is further configured to transmit the matching result to the TV; and based on the matching result, transmit a corresponding reward, such as, a resource, to the live broadcast client. In another example, the interaction task generating module is configured to generate the interaction task; and transmit the interaction task to the live broadcast client, such that the live broadcast client transmits the bullet-screen comment message for the interaction task. The processing module 920 is further configured to transmit the matching result to the live broadcast client; and based on the matching result, transmit a corresponding reward to the live broadcast client.

In an example, the processing module 920 is further configured to determine whether the bullet-screen comment message includes wrong answer data corresponding to the interaction task; if the bullet-screen comment message includes wrong answer data corresponding to the interaction task, a first matching result is obtained; and if the bullet-screen comment message does not include wrong answer data corresponding to the interaction task, the bullet-screen comment message is compared with correct answer data corresponding to the interaction task to obtain a second matching result. Where the first matching result indicates that the matching fails. When the bullet-screen comment message does not include wrong answer data corresponding to the interaction task, if the matching between the bullet-screen comment message and the correct answer data corresponding to the interaction task fails, the second matching result indicates that the matching fails; and if the matching between the bullet-screen comment message and the correct answer data corresponding to the interaction task is successful, the second matching result indicates that the matching is successful.

The examples of the present disclosure can take a form of computer program products implemented on one or more storage media (including but not limited to disk storage, CD-ROM, optical storage, etc.) containing program code. Computer-usable storage media include permanent and non-permanent, removable and non-removable media, and information storage can be implemented by any method or technology. The information can be computer readable instructions, data structures, modules of programs, or other data. Examples of storage media of a computer include, but are not limited to: a Phase-change Random Access Memory (PRAM), a Static Random-Access Memory (SRAM), a Dynamic Random Access Memory (DRAM), other types of Random Access Memory (RAM), Read-Only Memory (ROM), Electrically Erasable Programmable read only memory (EEPROM), Flash memory or other memory technology, CD-ROM (Compact Disc Read-Only Memory), Digital Video Disc (DVD) or other optical storage, magnetic cassette tape, Magnetic tape storage or other magnetic storage devices or any other non-transmission media can be used to store information that can be accessed by computing devices.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The above are only some examples of the present disclosure and are not intended to limit the present disclosure. Any modification, equivalent replacement, improvement, etc. made within the spirit and principles of the present disclosure should be included within the scope of protection of the present disclosure.

The invention claimed is:

1. An interaction method, comprising:
generating an interaction task, wherein the interaction task is displayed on a designated channel of a TV or a live broadcast client, and the interaction task is a quiz task including interaction option information corresponding to correct answer data and interaction option information corresponding to wrong answer data;
receiving a bullet-screen comment message transmitted by the live broadcast client;
in response to identifying one or more of one or more reference words from the bullet-screen comment message, comparing the bullet-screen comment message with answer data corresponding to the interaction task to obtain a matching result;
outputting the matching result;
recording the live broadcast client that transmitted the bullet-screen comment message; and
identifying that the bullet-screen comment message transmitted by the live broadcast client includes the one or more of the one or more reference words; and in response to the identifying that the bullet-screen comment message transmitted by the live broadcast client includes the one or more of the one or more reference words, skipping identifying other bullet-screen comment messages transmitted by the live broadcast client.

2. The method according to claim 1, further comprising:
configuring the one or more reference words based on content of the interaction task, wherein the one or more reference words includes one or more of:
a designated word; or
interaction option information in the interaction task.

3. The method according to claim 1, wherein the identifying of the one or more of the one or more reference words from the bullet-screen comment message comprises:
performing word segmentation processing on the bullet-screen comment message to obtain a processed bullet-screen comment message; and
identifying the one or more of the one or more reference words from the processed bullet-screen comment message.

4. The method according to claim 1, wherein in response to the identifying of the one or more of the one or more reference words from the bullet-screen comment message, the comparing of the bullet-screen comment message with the answer data corresponding to the interaction task comprises:
  in response to identifying an option corresponding to the interaction option information in the interaction task from the bullet-screen comment message, extracting the option; and
  comparing the option with the answer data corresponding to the interaction task.

5. The method according to claim 1, wherein the receiving of the bullet-screen comment message transmitted by the live broadcast client comprises:
  receiving the bullet-screen comment message transmitted by the live broadcast client within a preset time period.

6. The method according to claim 1, further comprising:
  transmitting the interaction task to a rebroadcast server, to enable the rebroadcast server to combine the interaction task with a live broadcast video stream into a target video stream and transmit the target video stream to the TV;
  generating a graphic code based on identification information of the designated channel of the live broadcast client and address information of the live broadcast client; and
  transmitting the graphic code to the TV, to enable the live broadcast client to transmit the bullet-screen comment message by scanning the graphic code displayed on the TV.

7. The method according to claim 6, further comprising:
  transmitting the matching result to the TV; and
  transmitting, based on the matching result, a corresponding reward to the live broadcast client.

8. The method according to claim 1, further comprising:
  transmitting the interaction task to the live broadcast client, to enable the live broadcast client to transmit the bullet-screen comment message for the interaction task.

9. The method according to claim 8, further comprising:
  transmitting the matching result to the live broadcast client; and
  transmitting, based on the matching result, a corresponding reward to the live broadcast client.

10. The method according to claim 1, wherein the comparing of the bullet-screen comment message with the answer data corresponding to the interaction task to obtain the matching result comprises:
  determining whether the bullet-screen comment message includes the wrong answer data corresponding to the interaction task;
  when the bullet-screen comment message includes the wrong answer data corresponding to the interaction task, obtaining a first matching result; and
  when the bullet-screen comment message does not include the wrong answer data corresponding to the interaction task, comparing the bullet-screen comment message with the correct answer data corresponding to the interaction task to obtain a second matching result.

11. An electronic device, comprising:
  a processor; and
  a memory for storing processor-executable instructions,
  wherein when reading the processor-executable instructions, the processor is configured to perform operations including:
    generating an interaction task, wherein the interaction task is displayed on a designated channel of a TV or a live broadcast client, and the interaction task is a quiz task including interaction option information corresponding to correct answer data and interaction option information corresponding to wrong answer data;
    receiving a bullet-screen comment message transmitted by the live broadcast client;
    identifying one or more of one or more reference words from the bullet-screen comment message; in response to the identifying of the one or more of the one or more reference words from the bullet-screen comment message, comparing the bullet-screen comment message with answer data corresponding to the interaction task to obtain a matching result; and
    outputting the matching result, and
  the operations further include:
    recording the live broadcast client that transmitted the bullet-screen comment message; and
    in response to identifying that the bullet-screen comment message transmitted by the live broadcast client includes the one or more of the one or more reference words, skipping identifying other bullet-screen comment messages transmitted by the live broadcast client.

12. The electronic device according to claim 11, wherein the operations further include:
  configuring the one or more reference words based on content of the interaction task, wherein the one or more reference words includes one or more of:
    a designated word; or
    interaction option information in the interaction task.

13. The electronic device according to claim 11, wherein the identifying of the one or more of the one or more reference words from the bullet-screen comment message comprises:
  performing word segmentation processing on the bullet-screen comment message to obtain a processed bullet-screen comment message; and
  identifying the one or more of the one or more reference words from the processed bullet-screen comment message.

14. The electronic device according to claim 11, wherein in response to the identifying of the one or more of the one or more reference words from the bullet-screen comment message, the comparing of the bullet-screen comment message with the answer data corresponding to the interaction task comprises:
  in response to identifying an option corresponding to the interaction option information in the interaction task from the bullet-screen comment message, extracting the option; and
  comparing the option with the answer data corresponding to the interaction task.

15. The electronic device according to claim 11, wherein the receiving of the bullet-screen comment message transmitted by the live broadcast client comprises:
  receiving the bullet-screen comment message transmitted by the live broadcast client within a preset time period.

16. The electronic device according to claim 11, wherein the operations further include:
  transmitting the interaction task to a rebroadcast server, to enable the rebroadcast server to combine the interaction task with a live broadcast video stream into a target video stream and transmit the target video stream to the TV;
  generating a graphic code based on identification information of the designated channel of the live broadcast client and address information of the live broadcast client; and transmitting the graphic code to the TV, to enable the live broadcast client to transmit the bullet-screen comment message by scanning the graphic code displayed on the TV.

17. The electronic device according to claim 16, wherein the operations further include:
transmitting the matching result to the TV; and
transmitting, based on the matching result, a corresponding reward to the live broadcast client.

18. A non-volatile and non-transitory machine-readable storage medium on which a computer program is stored, wherein when reading the computer program, a processor is caused to perform operations including:
generating an interaction task, wherein the interaction task is displayed on a designated channel of a TV or a live broadcast client, and the interaction task is a quiz task including interaction option information corresponding to correct answer data and interaction option information corresponding to wrong answer data;
receiving a bullet-screen comment message transmitted by the live broadcast client;
identifying one or more of one or more reference words from the bullet-screen comment message; in response to the identifying of the one or more of the one or more reference words from the bullet-screen comment message, comparing the bullet-screen comment message with answer data corresponding to the interaction task to obtain a matching result; and
outputting the matching result,
wherein the comparing of the bullet-screen comment message with the answer data corresponding to the interaction task to obtain the matching result comprises:
determining whether the bullet-screen comment message includes the wrong answer data corresponding to the interaction task; and
when the bullet-screen comment message does not include the wrong answer data corresponding to the interaction task, comparing the bullet-screen comment message with the correct answer data corresponding to the interaction task to obtain a second matching result.

\* \* \* \* \*